H. P. Harrell. Cotton Gin Attachment.
No. 119,140. Fig. 1.   Patented Sep. 19, 1871.   Fig. 2.
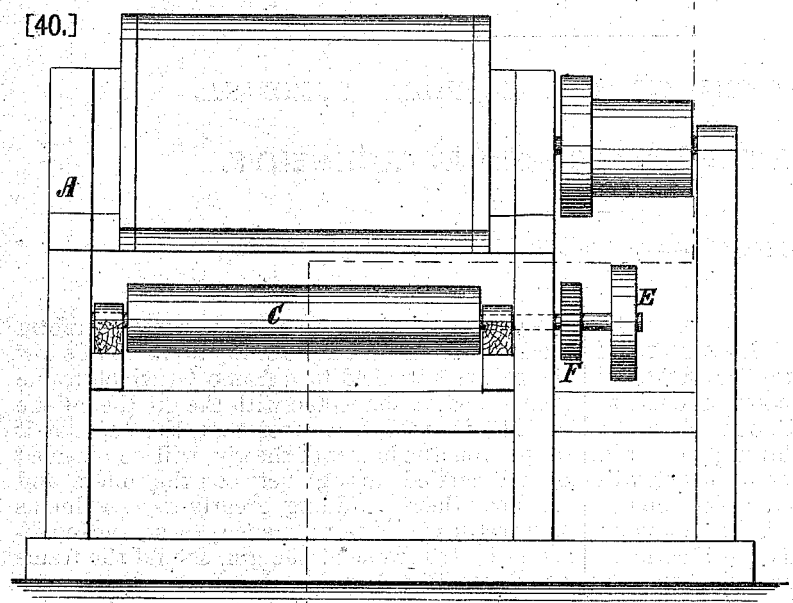
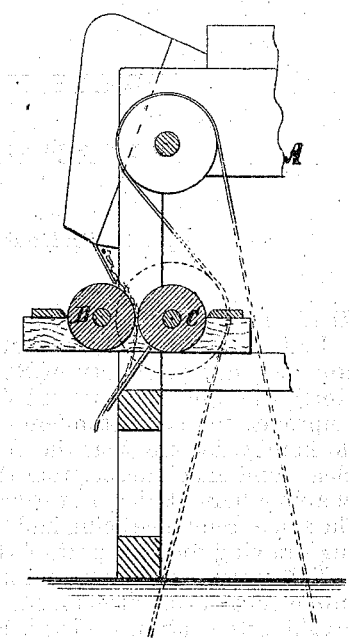
Fig. 3.
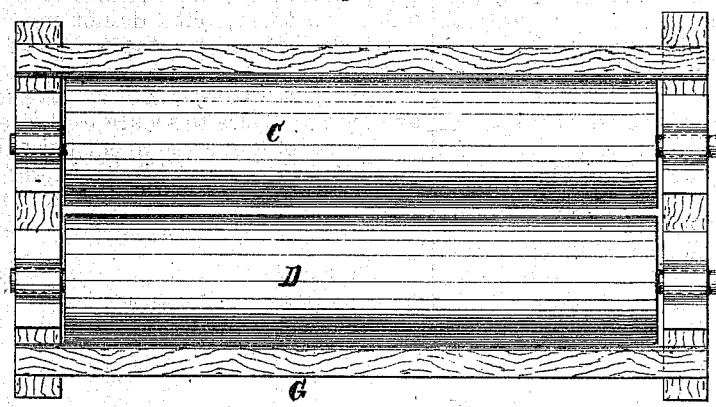
Witnesses:
A. Benneckendorf.
Wm. H. C. Smith.
Inventor:
H. P. Harrell.
per
Attorneys.

UNITED STATES PATENT OFFICE.

HIRAM P. HARRELL, OF ROXOBEL, NORTH CAROLINA.

IMPROVEMENT IN COTTON-GIN ATTACHMENTS.

Specification forming part of Letters Patent No. 119,140, dated September 19, 1871.

*To all whom it may concern:*

Be it known that I, HIRAM P. HARRELL, of Roxobel, in the county of Bertie and State of North Carolina, have invented a new and useful Improvement in Cotton-Gin Attachment; and I do hereby declare that the following is a full, clear, and exact description thereof, which will enable others skilled in the art to make and use the same, reference being had to the accompanying drawing forming part of this specification.

This invention relates to a new and useful improvement in an attachment to cotton-gins for crushing the cotton-seed as it is discharged from the breast of the gin; and it consists in attaching rollers to the gin, arranged so as to receive the seed and crush it as it leaves the breast of the gin, as will be hereinafter more fully described.

In the accompanying drawing, Figure 1 represents a front view of a cotton-gin with my crushing-rollers attached. Fig. 2 is a vertical section of Fig. 1 taken on the line $x$ $x$. Fig. 3 represents a top view of the crushing-rollers detached.

Similar letters of reference indicate corresponding parts.

A is the cotton-gin. C and D are the crushing-rollers, which are revolved in any convenient manner, either by means of the driving-belt of the gin, as indicated in dotted lines, or in any other suitable manner. E is a driving-pulley on the shaft of the roller C. F F are gear-wheels on the shafts of the rollers, by means of which the rollers are made to revolve with a uniform motion. In this example of my invention I show the rollers attached to a frame G, which frame is attached or connected with the gin (below the breast,) in such a manner that the seed, as it drops from the breast of the gin, will be received by and carried through between the rollers and crushed, thereby adding greatly to its value as as a fertilizer. The rollers may be supported directly by the frame of the gin, should the frame be adapted for that purpose.

I do not confine myself to any particular mode of supporting or driving my crushing-rollers; but I connect them with the gin so that the seed will be crushed thereby as it drops from the breast of the gin. In the cross-section, Fig. 2, my invention is illustrated. Aprons or guides are seen for conducting the seed to and from the rollers; and scrapers are arranged to constantly clean the rollers, should the crushed seed and oil adhere to them; but I do not confine myself to particulars as regards the details of the arrangement.

Having thus described my invention, I claim as new and desire to secure by Letters Patent—

The cotton-gin attachment formed of the rollers C and D, arranged for crushing cotton-seed, substantially as herein shown and described.

HIRAM P. HARRELL.

Witnesses:
JAMES P. JOHNSON,
W. W. TYLER.